United States Patent
Wu et al.

(10) Patent No.: US 6,778,959 B1
(45) Date of Patent: Aug. 17, 2004

(54) SYSTEM AND METHOD FOR SPEECH VERIFICATION USING OUT-OF-VOCABULARY MODELS

(75) Inventors: Duanpei Wu, San Jose, CA (US); Lex Olorenshaw, Corte Madera, CA (US); Xavier Menendez-Pidal, Los Gatos, CA (US); Ruxin Chen, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 723 days.

(21) Appl. No.: 09/691,877

(22) Filed: Oct. 18, 2000

Related U.S. Application Data (60) Provisional application No. 60/160,810, filed on Oct. 21, 1999.

(51) Int. Cl.⁷ .............................................. G10L 13/14
(52) U.S. Cl. ........................ 704/256; 704/251; 704/255
(58) Field of Search ................................ 704/256, 255, 704/250, 251

(56) References Cited

U.S. PATENT DOCUMENTS

| | | | | | |
|---|---|---|---|---|---|
| 5,832,063 A | * | 11/1998 | Vysotsky et al. | ........ | 379/88.03 |
| 5,832,430 A | * | 11/1998 | Lleida et al. | ................ | 704/256 |
| 5,842,165 A | * | 11/1998 | Raman et al. | ............... | 704/255 |
| 5,895,448 A | * | 4/1999 | Vysotsky et al. | ........ | 704/270.1 |
| 6,014,624 A | * | 1/2000 | Raman | ........................ | 704/243 |
| 6,061,653 A | * | 5/2000 | Fisher et al. | ................ | 704/256 |
| 6,076,054 A | * | 6/2000 | Vysotsky et al. | ............ | 704/240 |
| 6,125,345 A | * | 9/2000 | Modi et al. | .................. | 704/240 |
| 6,223,155 B1 | * | 4/2001 | Bayya | .......................... | 704/243 |
| 6,226,612 B1 | * | 5/2001 | Srenger et al. | ............. | 704/256 |
| 6,243,677 B1 | * | 6/2001 | Arslan et al. | ................ | 704/244 |
| 6,275,800 B1 | * | 8/2001 | Chevalier et al. | ........... | 704/246 |
| 6,292,778 B1 | * | 9/2001 | Sukkar | ........................ | 704/256 |

* cited by examiner

Primary Examiner—Vijay Chawan
Assistant Examiner—Michael N. Opsasnick
(74) Attorney, Agent, or Firm—Gregory J. Koerner; Simon & Koerner LLP (57) ABSTRACT

A system and method for speech verification using out-of-vocabulary models includes a speech recognizer that has a model bank with system vocabulary word models, a garbage model, and one or more noise models. The model bank may reject an utterance or other sound as an invalid vocabulary word when the model bank identifies the utterance or other sound as corresponding to the garbage model or the noise models. Initial noise models may be selectively combined into a pre-determined number of final noise model clusters to effectively reduce the number of noise models that are utilized by the model bank of the speech recognizer to verify system vocabulary words.

36 Claims, 7 Drawing Sheets

SYSTEM AND METHOD FOR SPEECH VERIFICATION USING OUT-OF-VOCABULARY MODELS

CROSS-REFERENCE TO RELATED APPLICATIONS

This application relates to, and claims priority in, U.S. Provisional Patent Application Serial No. 60/160,810, entitled "System And Method For Speech Verification Using Out-Of-Vocabulary Models", filed on Oct. 21, 1999. The foregoing related application is commonly assigned, and is hereby incorporated by reference.

BACKGROUND SECTION

1. Field of the Invention

This invention relates generally to electronic speech recognition systems, and relates more particularly to a system and method for speech verification using out-of-vocabulary models.

2. Description of the Background Art

Implementing an effective and efficient method for system users to interface with electronic devices is a significant consideration of system designers and manufacturers. Voice-controlled operation of electronic devices is a desirable interface for many system users. For example, voice-controlled operation allows a user to perform other tasks simultaneously. For instance, a person may operate a vehicle and operate an electronic organizer by voice control at the same time. Hands-free operation of electronic systems may also be desirable for users who have physical limitations or other special requirements.

Hands-free operation of electronic devices may be implemented by various speech-activated electronic systems. Speech-activated electronic systems thus advantageously allow users to interface with electronic devices in situations where it would be inconvenient or potentially hazardous to utilize a traditional input device. Electronic entertainment systems may also utilize speech recognition techniques to allow users to interact with a system by speaking to it.

Speech-activated electronic systems may be used in a variety of noisy environments such as industrial facilities, manufacturing facilities, commercial vehicles, passenger vehicles, homes, and office environments. A significant amount of noise in an environment may interfere with and degrade the performance and effectiveness of speech-activated systems. System designers and manufacturers typically seek to develop speech-activated systems that provide reliable performance in noisy environments.

In a noisy environment, sound energy detected by a speech-activated system may contain speech and a significant amount of noise or other non-typical sounds. In such an environment, the speech may be masked by the noise and be undetected. This result is unacceptable for reliable performance of the speech-activated system.

Alternatively, sound energy detected by the speech-activated system may contain only noise. The noise may be of such a character that the speech-activated system identifies the noise as speech. This result reduces the effectiveness of the speech-activated system, and is also unacceptable for reliable performance. Verifying that a detected signal is actually speech increases the effectiveness and reliability of speech-activated systems.

A speech-activated system may have a limited vocabulary of words that the system is programmed to recognize. The system should respond to words or phrases that are in its vocabulary, and should not respond to words or phrases that are not in its vocabulary. Verifying that a recognized word is in the system's vocabulary increases the accuracy and reliability of speech-activated systems.

Therefore, for all the foregoing reasons, implementing an effective and efficient method for a system user to interface with electronic devices remains a significant consideration of system designers and manufacturers.

SUMMARY

In accordance with the present invention, a system and method are disclosed for speech verification using out-of-vocabulary models. In one embodiment of the present invention, out-of-vocabulary models are created for use in a speech verification procedure by a speech recognition system. Initially, noise types to be modeled for use in the speech verification procedure are selected and a noise database is created. The foregoing noise types may be selected according to the intended operating environment of the speech recognition system. The noise types will typically include various human noises and other noise types that are likely to be encountered during use of the speech recognition system.

Next, an initial noise model for each type of noise is trained using the noise database. In certain embodiments, each initial noise model is preferably a Hidden Markov Model that is trained to recognize one of the different types of noise. A set of test noises is then preferably input to all of the initial noise models, and the initial noise models generate recognition scores for each test noise. Then, the recognition scores are preferably normalized by dividing the recognition scores by the duration of the corresponding test noise. The recognition scores may be normalized because a noise of short duration usually produces a higher recognition score than a noise of long duration for an arbitrary noise model.

The differential scores between each initial noise model for each test noise may then be calculated. Each test noise will produce a separate recognition score for each of the initial noise models. The mutual differences between all of these differential scores may then be calculated, and an average differential score between each initial noise model may then be determined.

Next, a distance matrix may be created to include the average differential scores between each initial noise model. Then, a minimum non-zero distance for the distance matrix may preferably be determined. The two initial noise models in the distance matrix that have a minimum distance typically are acoustically similar, and therefore may be grouped together as a noise cluster.

A new distance matrix may then be created to incorporate the distances between the new noise cluster and the remaining initial noise models. Distances between the new noise cluster and the remaining initial noise models may then be calculated by averaging the mutual distances between the noise models in the new noise cluster and every remaining initial noise model.

Then, a determination may be made as to whether the final number of noise clusters has been reached. The final number of noise clusters may preferably be chosen by the designer or manufacturer of the speech recognition system, and is typically a trade-off between accuracy and computational cost. In accordance with the present invention, the initial noise models continue to be grouped into new noise clusters until the final number of noise clusters is reached. When the pre-determined final number of noise clusters has been reached, then a final noise model is trained for each of the final noise clusters for use by the speech recognition system to perform a speech verification procedure. The present invention thus efficiently and effectively performs speech verification using out-of-vocabulary models.

DETAILED DESCRIPTION

The present invention relates to an improvement in speech recognition systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for speech verification using out-of-vocabulary models, and preferably includes a speech recognizer that has a model bank with system vocabulary word models, a garbage model, and one or more noise models. The model bank may preferably reject an utterance or other sound as an invalid vocabulary word when the model bank identifies the utterance or other sound as corresponding to the garbage model or the noise models. Initial noise models may be selectively combined into a pre-determined number of final noise model clusters to effectively and efficiently reduce the number of noise models that are utilized by the model bank of the speech recognizer to verify system vocabulary words.

Figure 1:
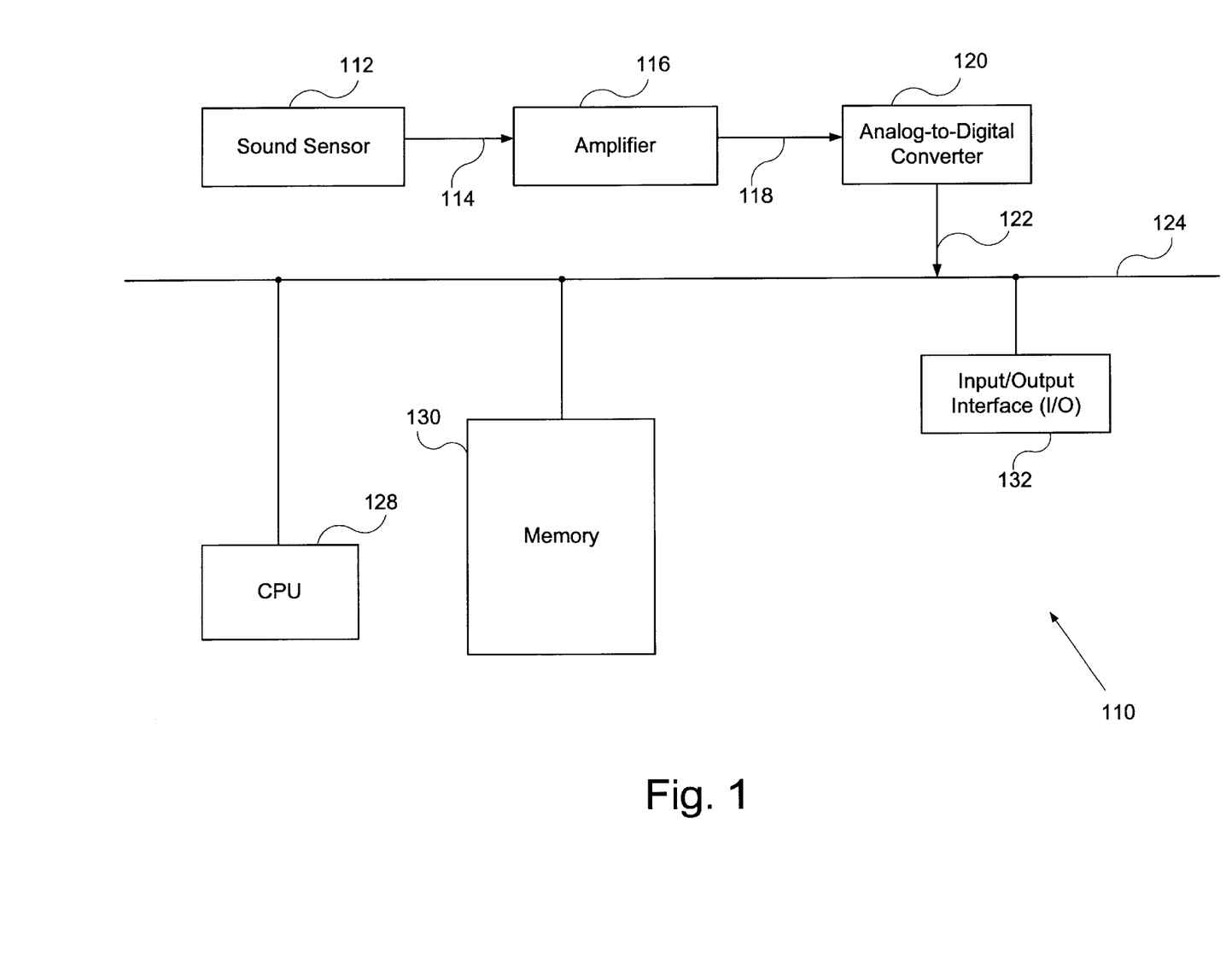
FIG. 1 is a block diagram for one embodiment of a computer system, in accordance with the present invention.

Referring now to FIG. 1, a block diagram for one embodiment of a computer system 110 is shown, according to the present invention. The FIG. 1 embodiment includes, but is not limited to, a sound sensor 112, an amplifier 116, an analog-to-digital converter 120, a central processing unit (CPU) 128, a memory 130 30, and an input/output interface 132.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 1then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech detection according to software instructions contained in memory 130. The operation of CPU 128 and the software instructions in memory 130 30 are further discussed below in conjunction with FIGS. 2–6(b). After the speech data is processed, CPU 128 may then provide the results of the speech detection analysis to other devices (not shown) via input/output interface 132.

Figure 2:
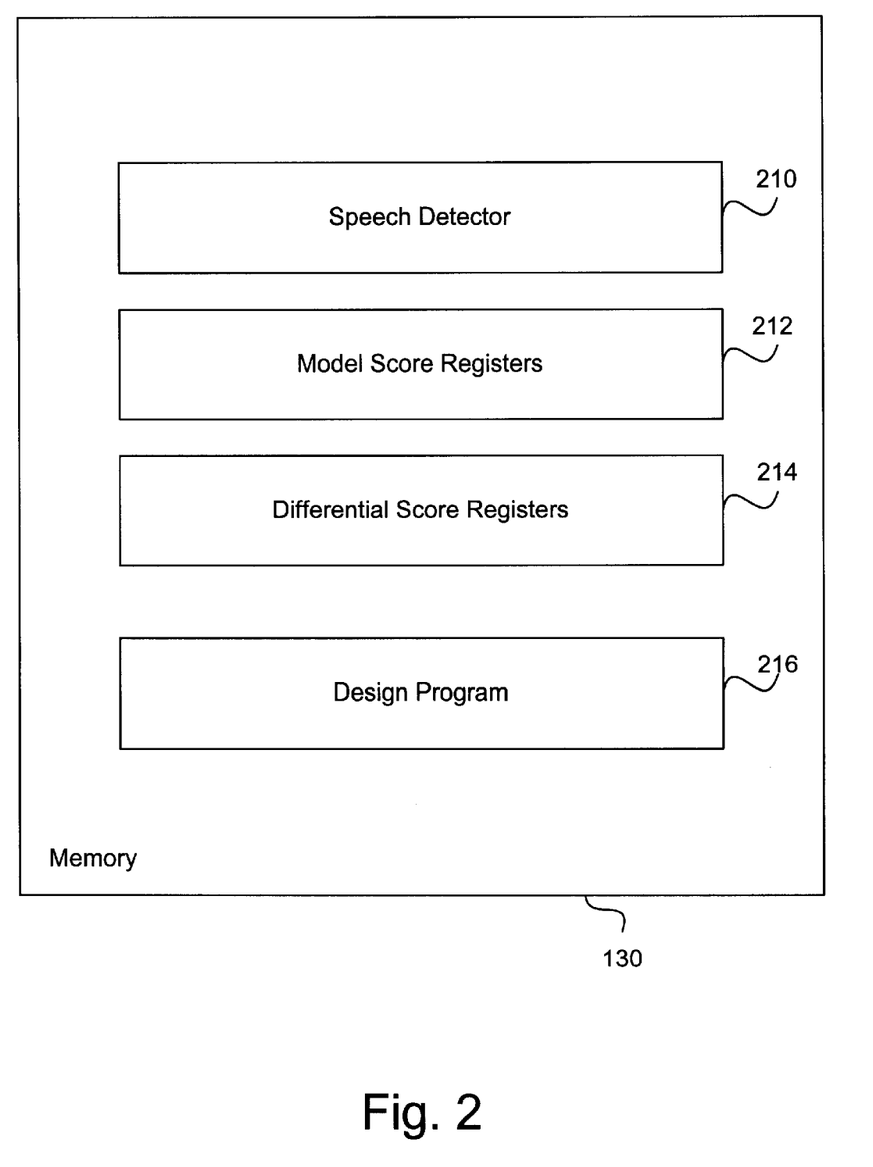
FIG. 2 is a block diagram for one embodiment of the memory of FIG. 1, in accordance with the present invention.

Referring now to FIG. 2, a block diagram for one embodiment of the memory 130 of FIG. 1 is shown, according to the present invention. Memory 130 may alternately comprise various storage-device configurations, including random access memory (RAM) and storage devices such as floppy discs or hard disc drives. In the FIG. 2 embodiment, memory 130 30 includes, but is not limited to, a speech detector 210, model score registers 212, and differential score registers 214.

In the FIG. 2 embodiment, speech detector 210 includes a series of software modules that are executed by CPU 128 to analyze and detect speech data, and which are further described below in conjunction with FIGS. 3–5. In alternate embodiments, speech detector 210 may readily be implemented using various other software and/or hardware configurations.

Model score registers 212 and differential score registers 214 contain respective variable values that are calculated and utilized by speech detector 210 to implement the speech verification method of the present invention. The utilization and functionality of model score registers 212 and differential score registers 214 are further discussed below in conjunction with FIGS. 4–6(b).

In certain embodiments, memory 130 may also comprise a design program 216 that preferably includes software instructions for designing and implementing a speech recognition system. In accordance with the present invention, design program 216 may specifically include instructions for implementing a speech verification process using out-of-vocabulary models. The operation and functionality of design program 216 is further discussed below in conjunction with FIGS. 6(a) and 6(b).

Figure 3:
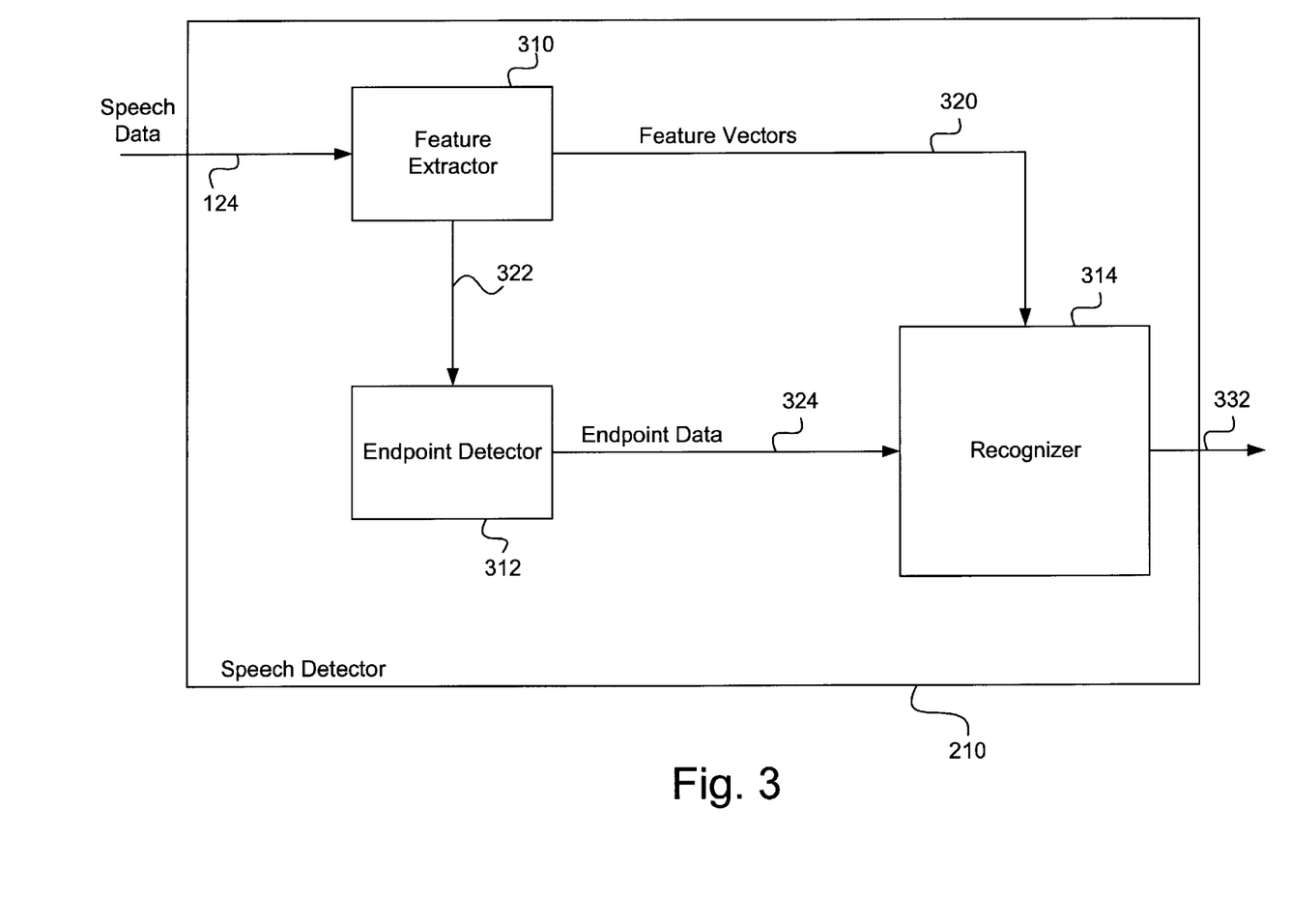
FIG. 3 is a block diagram for one embodiment of the speech detector of FIG. 2, in accordance with the present invention.

Referring now to FIG. 3, a block diagram for one embodiment of the speech detector 210 of FIG. 2 is shown, according to the present invention. Speech detector 210 includes, but is not limited to, a feature extractor 310, an endpoint detector 312, and a recognizer 314.

Analog-to-digital converter 120 (FIG. 1) provides digital speech data to feature extractor 310 via system bus 124. Feature extractor 310 responsively generates feature vectors, which are provided to recognizer 314 via path 320. Feature extractor 310 further responsively generates speech energy to endpoint detector 312 via path 322. Endpoint detector 312 analyzes the speech energy and responsively determines endpoints of an utterance represented by the speech energy. The endpoints indicate the beginning and end of the utterance in time. Endpoint detector 312 then provides the endpoints to recognizer 314 via path 324. The operation of endpoint detector 312 is further discussed in co-pending U.S. patent application Ser. No. 08/957,875, entitled "Method For Implementing A Speech Recognition System For Use During Conditions With Background Noise," file Oct. 20, 1997, which is hereby incorporated by reference.

Recognizer 314 receives feature vectors via path 320 and endpoint data via path 324, and responsively performs a speech recognition procedure to provide a speech recognition result to CPU 128 via path 332. Recognizer 314 is preferably configured to recognize isolated words in a predetermined vocabulary of system 110. In the FIG. 3 embodiment, recognizer 314 is configured to recognize a vocabulary of one hundred twenty-five words; however, a vocabulary including any number of words is within the scope of the present invention. The vocabulary words may correspond to commands or instructions for system 110. Thus, verifying that a recognized word is a valid vocabulary word is important for proper operation of system 110.

Figure 4:
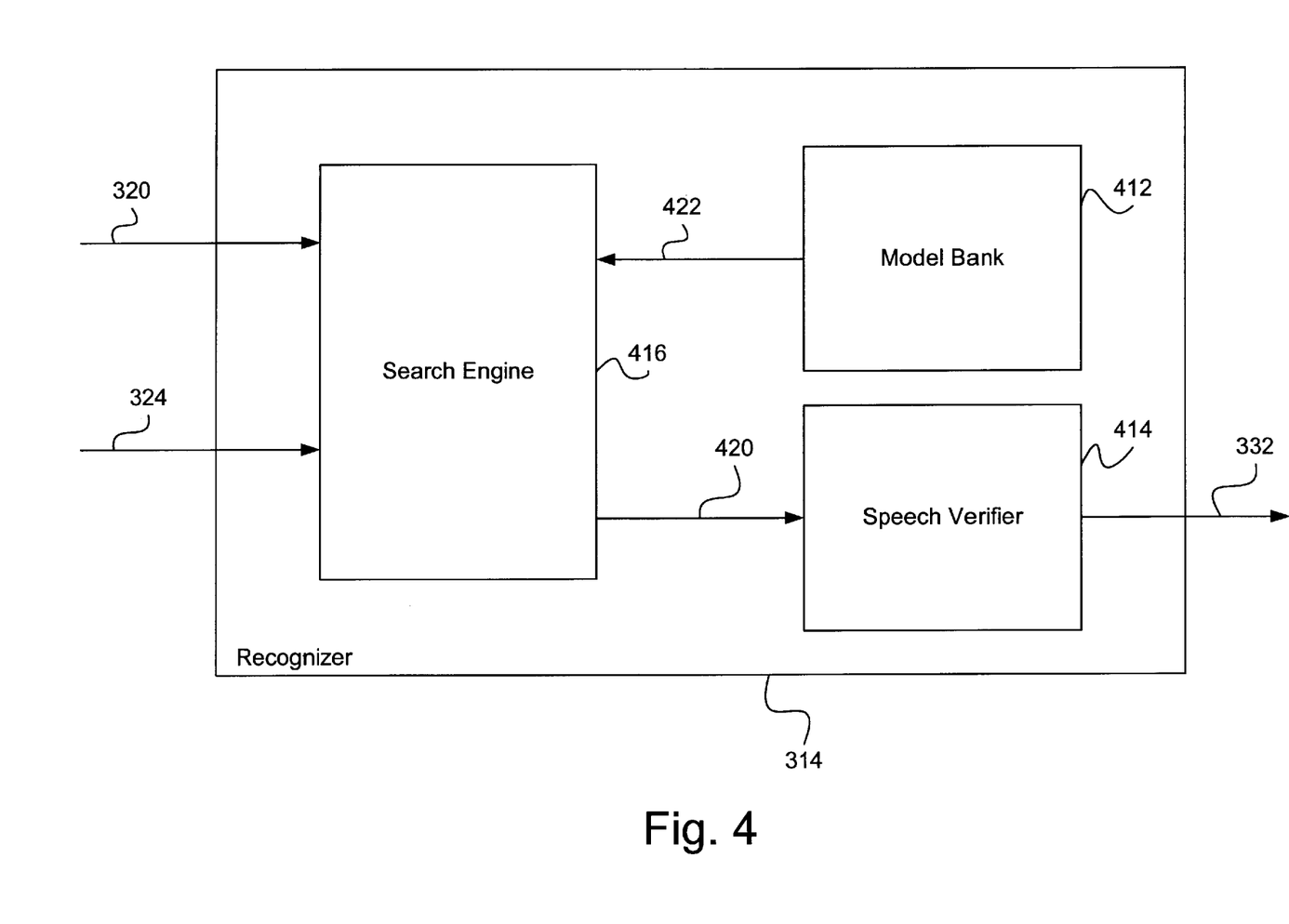
FIG. 4 is a block diagram for one embodiment of the recognizer of FIG. 3, in accordance with the present invention.

Referring now to FIG. 4, a block diagram for one embodiment of the recognizer 314 of FIG. 3 is shown, according to the present invention. Recognizer 314 includes, but is not limited to, a model bank 412 and a speech verifier 414. Model bank 412 preferably includes a word model for every word in the vocabulary of system 110. Each word model is preferably a Hidden Markov Model that has been trained to recognize a specific word in the vocabulary.

Hidden Markov Models (HMM) typically utilize feature vectors and endpoint information to recognize speech. An HMM may analyze the feature vectors between endpoints to produce a series of phones, which are input to a phonetic dictionary. Phones, also known as phonemes or phone-like units (plu), represent basic sound units of a spoken language. The HMM therefore is a software module that matches feature vectors from a portion of speech data to one of the phones. Hidden Markov Models are further discussed in *Automatic Speech Recognition: The Development of the SPHINX System*, by Kai-Fu Lee, Kluwer Academic Publishers, Boston, 1989, which is hereby incorporated by reference.

An HMM must be trained in order to recognize speech. An HMM is typically trained by providing the software module with an example of speech data for each phone or word to be recognized. The HMM is typically trained using speech training data that includes predetermined speech tokens and phones that represent the acoustic-phonetic content of the speech tokens. This training data is produced during offline speech processing which typically occurs during the manufacture of a speech recognition system.

The HMM training process typically creates a software model for each phone, word, or sound in the transformed phone dataset, and then each model is taught which sound data corresponds to the model using statistical learning techniques. Hidden Markov Model training is further discussed in "Speaker-Independent Phone Recognition Using Hidden Markov Models," by Kai-Fu Lee and Hsiao-Wuen Hon, *IEEE Transactions on Acoustics, Speech, and Signal Processing*, Vol. 37, No. 11, 1989, pp. 1641–1648, which is hereby incorporated by reference.

In accordance with the present invention, model bank 412 also includes out-of-vocabulary (OOV) models. Each OOV model is preferably a Hidden Markov Model that has been trained to recognize an out-of-vocabulary utterance or sound, which may be an out-of-vocabulary word or a non-stationary noise. The OOV models are further discussed below in conjunction with FIG. 5.

Model bank 412 receives feature vectors from feature extractor 310 via path 320, and receives endpoint data from endpoint detector 312 via path 324. Model bank 412 inputs the feature vectors for an utterance or sound (the signal between endpoints) to each model. Each model produces a recognition score for the utterance or sound. Model bank 412 ranks the recognition scores for the utterance or sound from highest to lowest, and stores the recognition scores in model score registers 212. The model that produced the highest recognition score is the first candidate, the model that produced the next highest recognition score is the second candidate, and so on for all models in model bank 412. Typically, the first candidate is considered to be the recognized word.

Model bank 412 outputs the ranked recognition scores to speech verifier 414 via path 420. Speech verifier 414 performs a speech verification process that is described in co-pending Provisional Application No. 09/553,985, entitled "System And Method For Speech Verification Using A Confidence Measure," filed Apr. 20, 2000, which is hereby incorporated by reference.

Figure 5:
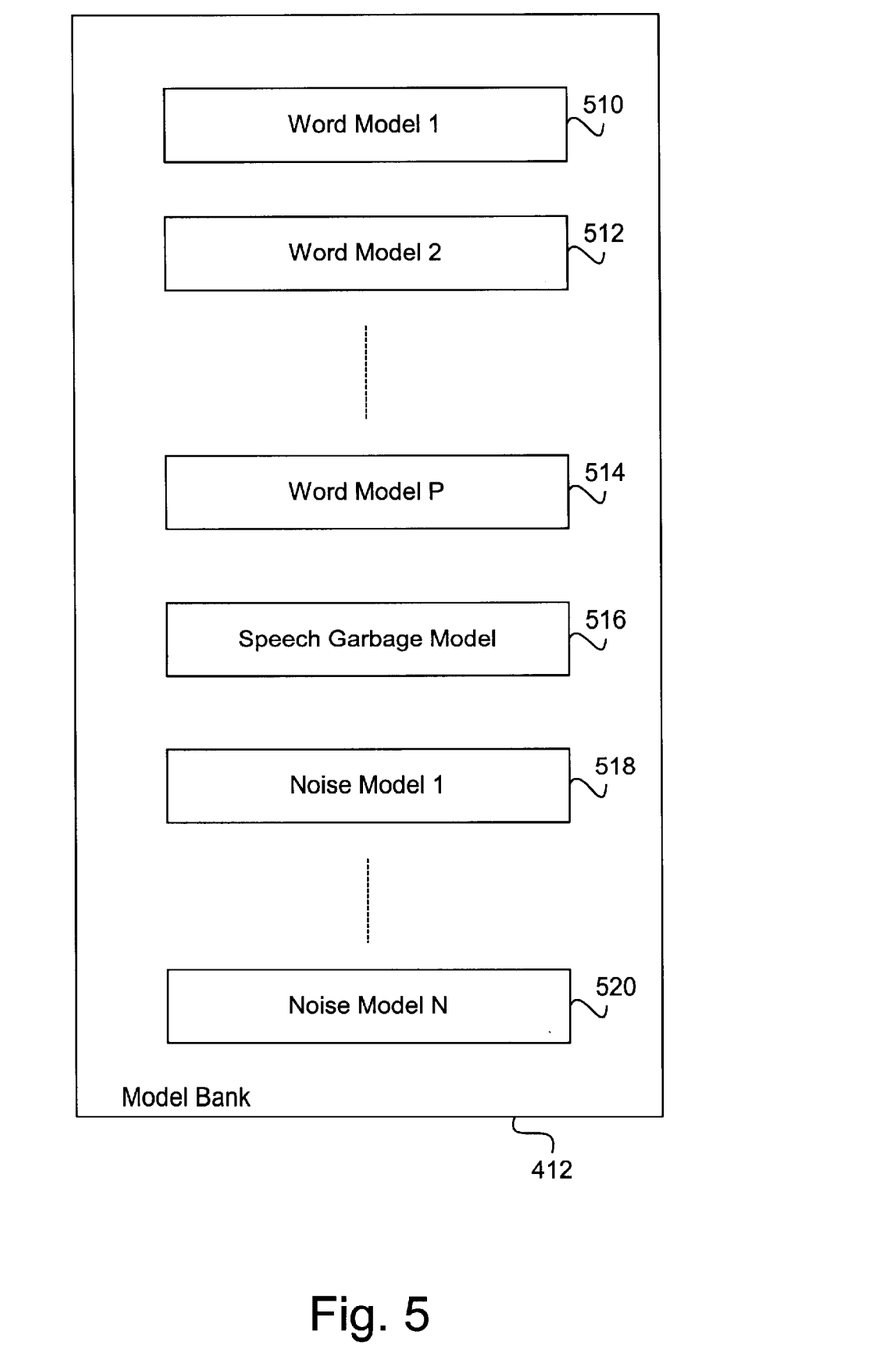
FIG. 5 is a block diagram for one embodiment of the model bank of FIG. 4, in accordance with the present invention.

Referring now to FIG. 5, a block diagram for one embodiment of model bank 412 of FIG. 4 is shown, according to the present invention. Model bank 412 includes, but is not limited to, a word model for each word in the system vocabulary, a garbage model 516, and a plurality of noise models 518–520.

For a vocabulary of P words, model bank 412 includes a word model for each vocabulary word, including word model 1 (510), word model 2 (512), and word model P (514). Each word model has been trained to recognize a specific vocabulary word using various effective speech recognition techniques.

Model bank 412 also includes out-of-vocabulary (OOV) models. One of these OOV models is a garbage model 516. Garbage model 516 is preferably a single-phone Hidden Markov Model that has been trained with a large database of utterances that includes all the vocabulary words of system 110 and a significantly larger number of out-of-vocabulary words. The out-of-vocabulary training utterances may be selected at random, or may be selected according to the probability that system 110 will encounter these words in its intended operating environment. Garbage model 516 is preferably trained before the word models of model bank 412 are trained.

If garbage model 516 is ranked as the first candidate for an utterance input to model bank 412, the utterance is considered to be an invalid vocabulary word, or garbage. Model bank 412 then rejects the utterance and does not forward the recognition scores of the utterance to speech verifier 414.

Model bank 412 also includes N noise models, including noise model 1 (518) and noise model N (520). Each noise model is trained to recognize specific types of non-stationary noise. If one of the noise models produces a maximum recognition score for a noise, that noise is rejected as an invalid vocabulary word by recognizer 314.

The noise models 518 are preferably trained to recognize noises that system 110 will likely encounter in its intended operating environment. For example, if system 110 is used in an office environment, system 110 may encounter noises such as keyboard clicks and rolling chairs. Alternatively, if system 110 is used in an automobile, system 110 may encounter noises such as opening/closing doors and auto horns. System 110 is likely to encounter various human noises, such as coughing, sneezing, and laughter, in any operating environment.

Although system 110 may encounter a significant number of different types of noise, utilizing a noise model for each type of noise would be inefficient in terms of system resources. Thus model bank 412 preferably includes a noise model for each of a group of selected noise clusters, wherein each noise cluster includes several acoustically similar types of noise.

Figure 6A:
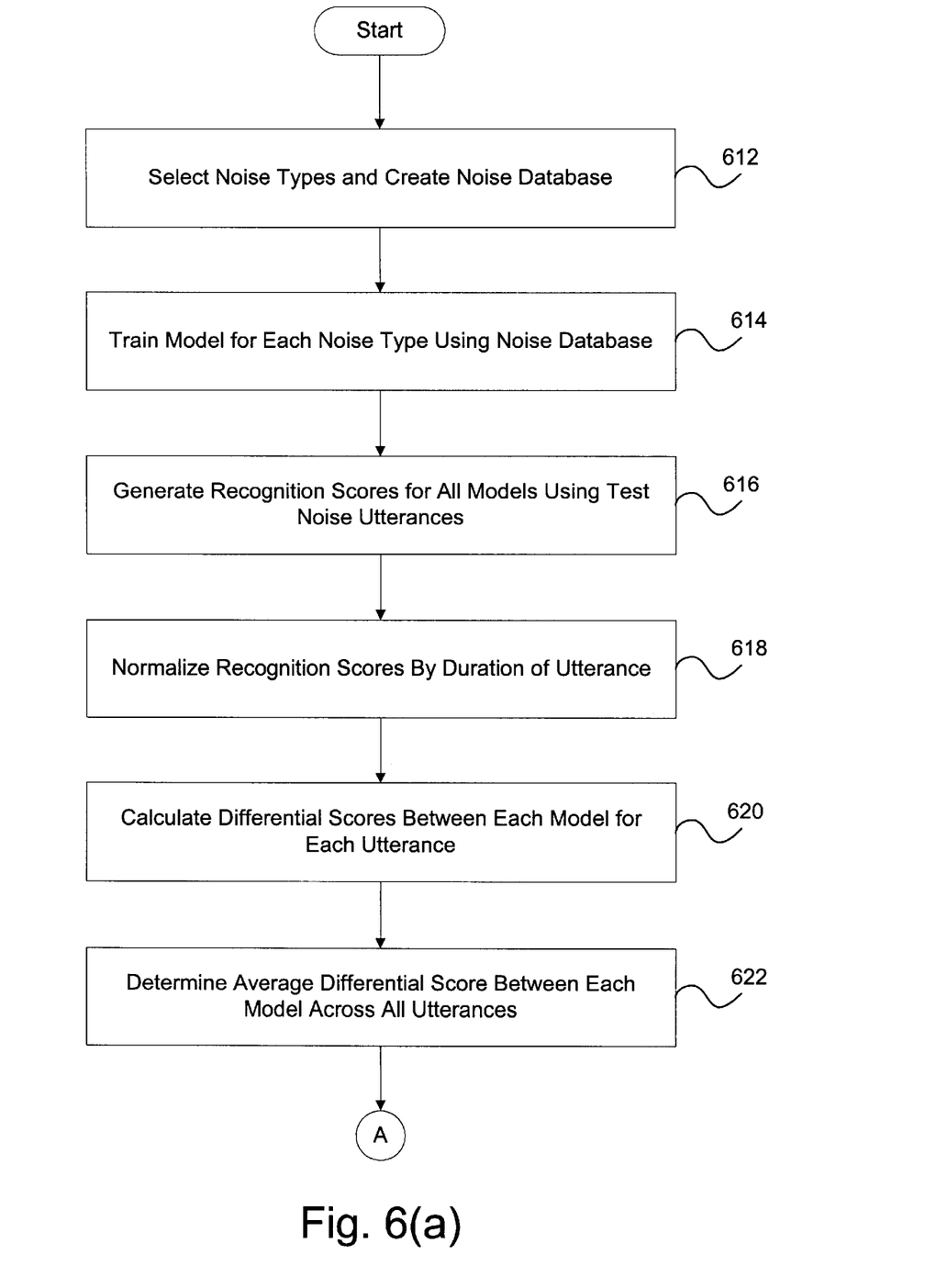
FIG. 6(a) is a flowchart of initial method steps for creating the noise models of FIG. 5, in accordance with one embodiment of the present invention.
Figure 6B:
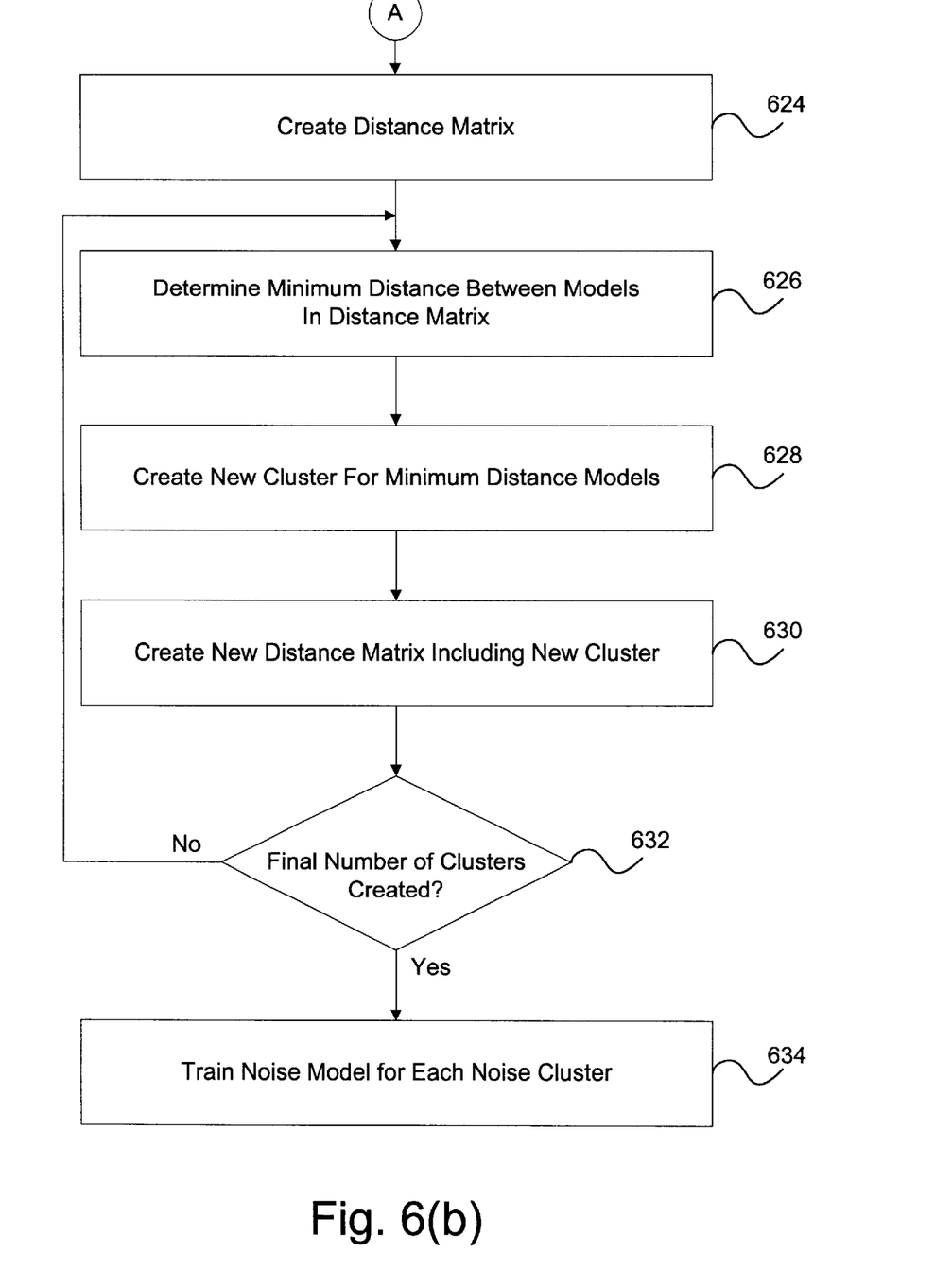
FIG. 6(b) is a flowchart of final method steps for creating the noise models of FIG. 5, in accordance with one embodiment of the present invention.

Referring now to FIG. 6(*a*), a flowchart of initial method steps for creating the noise models of FIG. 5 is shown, according to one embodiment of the present invention. The FIG. 6(a) and FIG. 6(b) flowcharts are presented for purposes of illustration, and, in alternate embodiments, the present invention may readily create noise models using various other steps and sequences than those discussed in conjunction with the FIGS. 6(a) and 6(b) embodiments.

In the FIG. 6(a) and FIG. 6(b) embodiments, a system design program preferably may perform certain steps and sequences in the procedure for creating noise models. In alternate embodiments, certain steps and sequences in the procedure for creating noise models may also be performed manually by a person skilled in the art.

In the FIG. 6(a) embodiment, initially in step 612, the noise types to be modeled are preferably selected and a noise database is preferably created. The noise types may be selected according to the intended operating environment of system 110. The noise types typically may include various human noises and other noise types that are likely to be encountered by system 110. In the FIG. 6 embodiment, twenty-one types of noise are preferably selected, and a noise database may be created by recording several samples of each type of noise.

Next, in step 614, a noise model for each type of noise is trained using the noise database. In the FIG. 6 embodiment, twenty-one noise models are trained using the noises in the noise database. Each noise model is preferably a Hidden Markov Model that is trained to recognize one of the twenty-one types of noise.

In step 616, a set of test noises is input to all twenty-one noise models, and the noise models generate recognition scores for each test noise. Then, in step 618, the recognition scores are normalized by dividing the recognition scores by the duration of the test noise. The recognition scores are normalized because a test noise of short duration usually produces a higher recognition score than a test noise of long duration for an arbitrary noise model. The normalized recognition scores may be represented as:

$N_1 \rightarrow [S_{U1(1)}, S_{U2(1)}, \ldots S_{UL(1)}]$
$N_2 \rightarrow [S_{U1(2)}, S_{U2(2)}, \ldots S_{UL(2)}]$
.
.
.
$N_{21} \rightarrow [S_{U1(21)}, S_{U2(21)}, \ldots S_{UL(21)}]$ where N is a noise model, S is a normalized recognition score for a test noise U, and L is the number of test noises for each noise model.

In step 620, differential scores between each model for each test noise are calculated. Each test noise will produce twenty-one recognition scores, one for each noise model. The mutual differences between all of these recognition scores are calculated. Then, in step 622, an average differential score between each noise model is determined.

Referring now to FIG. 6(b), a flowchart of final method steps for creating the noise models of FIG. 5 is shown, according to one embodiment of the present invention. The method continues with step 624, where a distance matrix is created. The distance matrix is a matrix of the average differential scores between each noise model. The distance matrix may be represented as:

| | $N_1$ | $N_2$ | $N_3$ | ... | $N_{21}$ |
|---|---|---|---|---|---|
| $N_1$ | 0 | $X_{1-2}$ | $X_{1-3}$ | ... | $X_{1-21}$ |
| $N_2$ | $X_{1-2}$ | 0 | $X_{2-3}$ | ... | $X_{2-21}$ |
| $N_3$ | $X_{1-3}$ | $X_{2-3}$ | 0 | ... | $X_{3-21}$ |
| . | ... | ... | ... | ... | ... |
| $N_{21}$ | $X_{1-21}$ | $X_{2-21}$ | $X_{3-21}$ | ... | 0 | where N is a noise model and X is an average differential score, or distance, between noise models. For example, $X_{1-2}$ is the average distance between the recognition scores of noise model 1 ($N_1$) and noise model 2 ($N_2$), and $X_{3-21}$ is the average distance between the recognition scores of noise model 3 ($N_3$) and noise model 21 ($N_{21}$).

Next, in step 626, a minimum non-zero distance of the distance matrix is determined. The two noise models with a minimum distance are acoustically similar, and may be grouped together as a noise cluster in step 628. If, for example, the minimum distance in the above matrix is $X_{1-2}$, then the noise models $N_1$ and $N_2$ are merged to create a new noise cluster, $N_{1-2}$.

In step 630, a new distance matrix is created which incorporates the distances between the new noise cluster and the other noise models. A distance between the new noise cluster and every other noise model may be calculated by averaging the mutual distances between the noise models in the new noise cluster and every other noise model. For example, a distance between the noise cluster $N_{1-2}$ and $N_3$ may be calculated as:

$$X_{(1-2)-3} = \frac{1}{2}(X_{1-3} + X_{2-3})$$

A distance matrix including distances to noise cluster $N_{1-2}$ may be represented as:

| | $N_{1-2}$ | $N_3$ | $N_4$ | ... | $N_{21}$ |
|---|---|---|---|---|---|
| $N_{1-2}$ | 0 | $X_{(1-2)-3}$ | $X_{(1-2)-4}$ | ... | $X_{(1-2)-21}$ |
| $N_3$ | $X_{(1-2)-3}$ | 0 | $X_{3-4}$ | ... | $X_{3-21}$ |
| $N_4$ | $X_{(1-2)-4}$ | $X_{3-4}$ | 0 | ... | $X_{4-21}$ |
| . | ... | ... | ... | ... | ... |
| $N_{21}$ | $X_{(1-2)-21}$ | $X_{3-21}$ | $X_{4-21}$ | ... | 0 |

Next, in step 632, a determination is made as to whether the final number of noise clusters has been reached. The final number of noise clusters is chosen by the designer or manufacturer of system 110 and is typically a trade-off between accuracy and computational cost. In the FIG. 6 embodiment, the final number of noise clusters is preferably six. If the final number of noise clusters have not been reached, the method returns to step 626, where a minimum distance of the current distance matrix is preferably determined. The noise models continue to be grouped into noise clusters until the final number of noise clusters has been reached.

If the final number of noise clusters has been reached, then the method continues with step 634, where a final noise model is trained for each final noise cluster. For example, if a final noise cluster includes three noise models, the a final noise model for that final noise cluster will be trained to recognize all three types of noise corresponding to the three noise models included in the final noise cluster.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for performing a speech verification of a sound, comprising:
   a recognizer configured to verify that said sound is valid by referencing a model bank that includes system vocabulary word models and out-of-vocabulary models, said out-of-vocabulary models including at least one of a garbage model and one or more noise models; and
   a processor configured to control said recognizer to thereby perform said speech verification, said speech verification including selecting noise model types for said noise models based upon an intended operating environment, and creating respective noise databases for training initial noise models by recording one or more samples of said noise model types.

2. The system of claim 1 wherein said recognizer includes at least one of a search engine, a speech verifier, and said model bank.

3. The system of claim 1 wherein at least one of said system vocabulary word models and said out-of-vocabulary models is implemented as a Hidden Markov Model.

4. The system of claim 1 wherein said model bank rejects said sound as an invalid vocabulary word when said model bank identifies said sound as corresponding to said garbage model.

5. The system of claim 1 wherein said garbage model is trained with system vocabulary words and out-of-vocabulary words.

6. The system of claim 5 wherein said garbage model is trained before training said system vocabulary word models.

7. A system for performing a speech verification of a sound, comprising:
   a recognizer configured to verify that said sound is valid by referencing a model bank that includes system vocabulary word models and out-of-vocabulary models, said out-of-vocabulary models including at least one of a garbage model and one or more noise models, each of said one or more noise models being trained to correspond to one of a specific noise and a noise cluster, said model bank rejecting said sound as an invalid vocabulary word when said model bank identifies said sound as corresponding to one of said specific noise and said noise cluster; and
   a processor configured to control said recognizer to thereby perform said speech verification.

8. The system of claim 1 wherein said initial noise models are trained using said respective noise databases so that each of said initial noise models corresponds to one of said noise model types.

9. The system of claim 8 wherein a set of test noises is input to each of said initial noise models, said initial noise models responsively generating recognition scores for each of said test noises.

10. The system of claim 9 wherein a design program normalizes said recognition scores to produce normalized recognition scores by dividing said recognition scores by a corresponding test noise duration time.

11. The system of claim 10 wherein said design program calculates individual differential scores between each of said initial noise models by calculating a difference of said recognition scores for each of said test noises.

12. The system of claim 11 wherein said design program calculates an average differential score between each of said initial noise models based on all of said individual differential scores corresponding to said test noises.

13. The system of claim 12 wherein said design program creates a distance matrix that includes every possible pairing of said initial noise models, said distance matrix including distance entries that each corresponds to said average differential score for a corresponding pairing of said initial noise models.

14. The system of claim 13 wherein said design program regroups said most-similar pair of said initial noise models to generate a noise model cluster.

15. The system of claim 13 wherein said design program calculates a minimum non-zero distance entry to identify a most-similar pair of said initial noise models.

16. The system of claim 15 wherein said design program generates a reconfigured distance matrix that substitutes said noise model cluster for said most-similar pair of said initial noise models and generates recalculated distance entries, said reconfigured distance matrix including every possible pairing of said initial noise models and said noise model cluster, said reconfigured distance matrix including said recalculated distance entries that each corresponds to said average differential score for one of said corresponding pairings of said initial noise models and said noise model cluster.

17. The system of claim 16 wherein said design program repeatedly recalculates new minimum non-zero distances, repeatedly generates new noise model clusters, and repeatedly generates new reconfigured distance matrices until a pre-determined number of final noise model clusters is reached.

18. The system of claim 17 wherein said model bank includes final noise models that are each trained using a respective one of said final noise model clusters.

19. A method for performing a speech verification of a sound, comprising:
   verifying that said sound is valid with a recognizer by referencing a model bank that includes system vocabulary word models, and out-of-vocabulary models, said out-of-vocabulary models including at least one of a garbage model and one or more noise models, each of said one or more noise models being trained to correspond to one of a specific noise and a noise cluster, said model bank rejecting said sound as an invalid vocabulary word when said model bank identifies said sound as corresponding to one of said specific noise and said noise cluster:and
   controlling said recognizer with a processor to thereby perform said speech verification.

20. The method of claim 19 wherein said recognizer includes at least one of a search engine, a speech verifier, and said model bank.

21. The method of claim 19 wherein at least one of said system vocabulary word models and said out-of-vocabulary models is implemented as a Hidden Markov Model.

22. The method of claim 19 wherein said model bank rejects said sound as an invalid vocabulary word when said model bank identifies said sound as corresponding to said garbage model.

23. The method of claim 19 wherein said garbage model is trained with system vocabulary words and out-of-vocabulary words.

24. The method of claim 23 wherein said garbage model is trained before training said system vocabulary word models.

25. A method for performing a speech verification of a sound, comprising:

verifying that said sound is valid with a recognizer by referencing a model bank that includes system vocabulary word models, and out-of-vocabulary models, said out-of-vocabulary models including at least one of a garbage model and one or more noise models; and controlling said recognizer with a processor to thereby perform said speech verification, said speech verification including selecting noise model types for said noise models based upon an intended operating environment, and creating respective noise databases for training initial noise models by recording one or more samples of said noise model types.

26. The method of claim 25 wherein said initial noise models are trained using said respective noise databases so that each of said initial noise models corresponds to one of said noise model types.

27. The method of claim 26 wherein a set of test noises is input to each of said initial noise models, said initial noise models responsively generating recognition scores for each of said test noises.

28. The method of claim 27 wherein a design program normalizes said recognition scores to produce normalized recognition scores by dividing said recognition scores by a corresponding test noise duration time.

29. The method of claim 28 wherein said design program calculates individual differential scores between each of said initial noise models by calculating a difference of said recognition scores for each of said test noises.

30. The method of claim 29 wherein said design program calculates an average differential score between each of said initial noise models based on all of said individual differential scores corresponding to said test noises.

31. The method of claim 30 wherein said design program creates a distance matrix that includes every possible pairing of said initial noise models, said distance matrix including distance entries that each corresponds to said average differential score for a corresponding pairing of said initial noise models.

32. The method of claim 31 wherein said design program regroups said most-similar pair of said initial noise models to generate a noise model cluster.

33. The method of claim 31 wherein said design program calculates a minimum non-zero distance entry to identify a most-similar pair of said initial noise models.

34. The method of claim 33 wherein said design program generates a reconfigured distance matrix that substitutes said noise model cluster for said most-similar pair of said initial noise models and generates recalculated distance entries, said reconfigured distance matrix including every possible pairing of said initial noise models and said noise model cluster, said reconfigured distance matrix including said recalculated distance entries that each corresponds to said average differential score for one of said corresponding pairings of said initial noise models and said noise model cluster.

35. The method of claim 34 wherein said design program repeatedly recalculates new minimum non-zero distances, repeatedly generates new noise model clusters, and repeatedly generates new reconfigured distance matrices until a pre-determined number of final noise model clusters is reached.

36. The method of claim 35 wherein said model bank includes final noise models that are each trained using a respective one of said final noise model clusters.

* * * * *